June 27, 1939.  G. R. COLEMAN  2,163,587
JOURNAL BEARING
Filed Oct. 19, 1936  2 Sheets-Sheet 2

INVENTOR.
Gilbert R. Coleman
BY
Charles B. Rasmussen
ATTORNEY.

Patented June 27, 1939

2,163,587

UNITED STATES PATENT OFFICE 2,163,587

JOURNAL BEARING

Gilbert R. Coleman, Bellevue, N. Y.

Application October 19, 1936, Serial No. 106,459

7 Claims. (Cl. 308—79.1)

This invention relates in general to improvements in bearings and, while it has more particular reference to journal bearings used on railway rolling stock, it will be apparent that certain features of the invention have other and more general applications.

A principal object of the invention is the provision in a journal bearing of means for automatically supplying an abundance of lubricating oil to the top of the rotary journal associated therewith to effectively cool the bearing and to avoid heating thereof by reducing friction and wear.

As is pointed more specifically in my co-pending application for U. S. Letters Patent, Serial No. 67,064, filed March 4, 1936, that portion of a journal bearing which is most affected by the heat generated during the operation thereof is the bonded surface between the main body portion and the lining secured thereto. To insure effective cooling of this bonded surface and supply oil to the top portion of the journal, the above-mentioned application provides separate conduits extending through the bearing adjacent said surface which serve as passageways for the automatic circulation of lubricating oil through the bearing from the inbound side to the top portion of the bearing, where some of the oil is deposited on the journal, and from there to the outbound side of the journal. These conduits are constructed of a material which is impervious to the action of the lubricating oil, and are arranged so that there is substantially no possibility of the lubricating oil coming in contact with the bonded surface between the main body portion and the lining. These latter features are employed because the lubricating oil has a deteriorating action on the solder or other bond employed and will cause the latter to disintegrate with a consequent failure of the bearing.

More specifically, therefore, the object of the instant invention is the provision of an oil cooling reservoir in such a bearing adjacent the central or crown portion of said bonded surface, which communicates with said conduits and with the top portion of the journal and is so formed as to substantially eliminate the possibility of the lubricating oil coming in contact with the bonded surface.

Another important object of the invention is the provision of such a journal bearing which obviates the necessity of accurate alinement of the apertures through the top portion of the lining into the oil reservoir in the bearing.

Numerous other objects and advantages of the invention will be apparent as it is better understood from the following description, which, when taken in connection with the accompanying drawings, discloses a preferred embodiment thereof.

Figure 1:
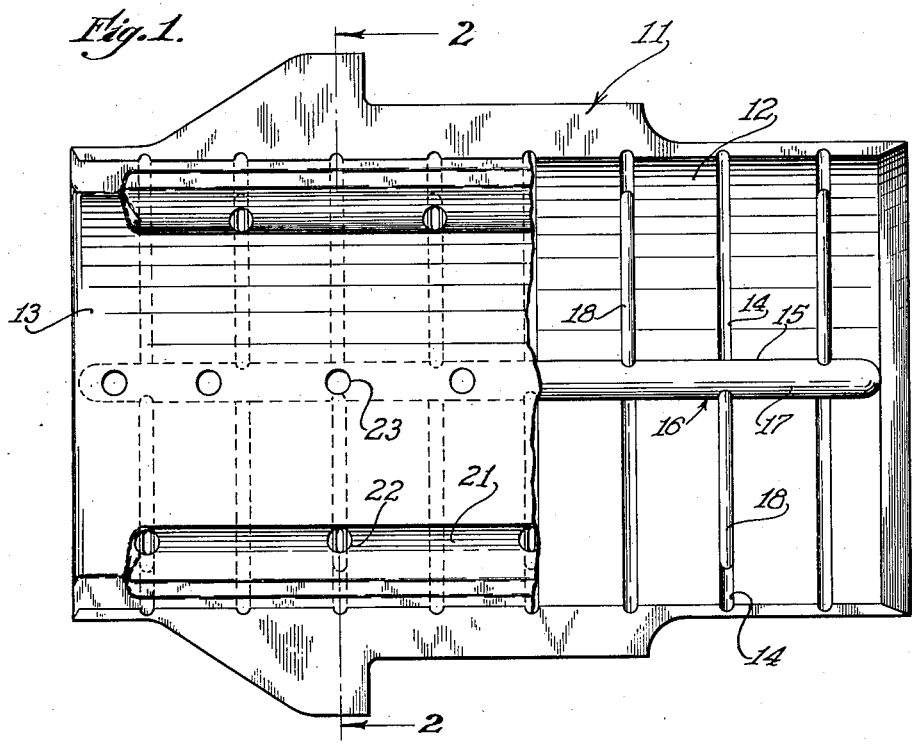
Figure 1 is a bottom plan view of a journal bearing embodying the features of the invention with part of the lining broken away to show the conduits mounted in the grooves in the concave surface of the main body portion.

Referring more particularly to the drawings, reference numeral 11 indicates the body portion of a non-rotary member of a journal bearing, commonly called the "brass", which may be of any desired form and is preferably cast from some suitable alloy. The body portion 11 is provided with a lower concave surface 12 to which is applied a lining 13 of babbitt or other suitable material, which is applied in the usual manner to the surface 12 after it has been tinned or soldered so that it will adhere firmly thereto.

Formed in the lower surface 12 of the main body portion 11, by machining or by being cast therein, are a plurality of transverse grooves or channels 14 interconnecting at their central portions with a longitudinal channel or groove 15. Any desired number of these grooves 14 may be provided and they are preferably spaced in parallel relationship to each other and extend completely across the lower surface 12. The grooves 14 and 15 are preferably substantially semi-circular in cross-section, with the central longitudinal groove 15 of somewhat larger diameter than the transverse grooves 14.

Figure 2:
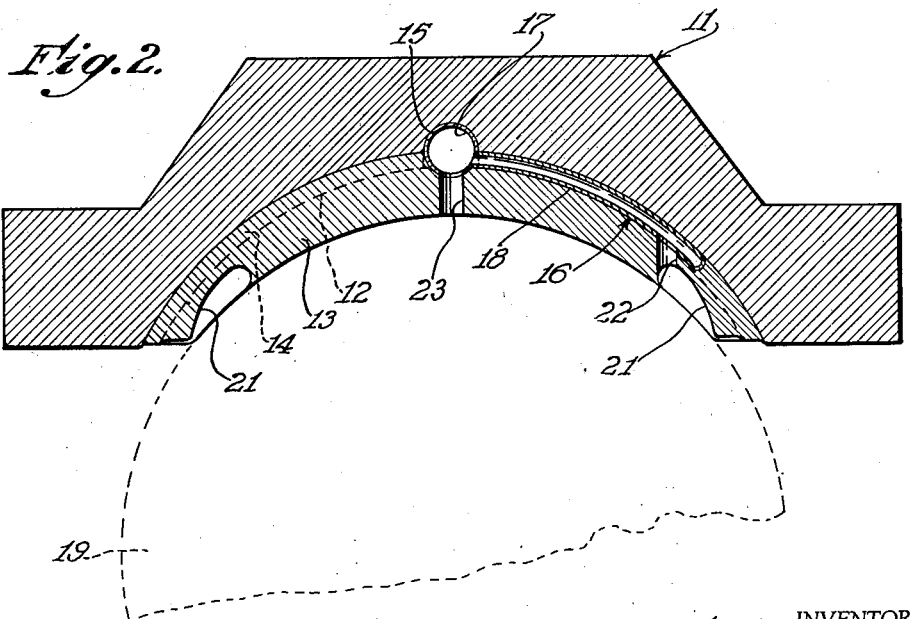
Fig. 2 is a vertical section taken substantially on the line 2—2 of Fig. 1.

In the form of journal shown in Figures 1 and 2, a unitary assemblage of interconnecting closed tubular members, indicated generally by reference numeral 16, is positioned within the grooves 14 and 15. This assemblage 16 preferably comprises a central tube 17 which is positioned within the longitudinal groove 15, and a plurality of laterally extending curved tubes 18 formed integrally with and communicating with the central tube 17 and adapted to be positioned within the transverse grooves 14. As shown in Figure 1, the transverse tubes 18 are disposed within alternate grooves 14 on opposite sides of the central tube 17. While this arrangement is preferred, any other suitable one may be employed that is desired. The tubular assemblage 16 is preferably formed of metal tubing, such as copper, although any other suitable material, which is impervious to the action of the oil used for lubricating the bearing, and any desired shape may be employed. The outer ends of the tubes 17 and 18 are closed.

The tubular assemblage 16 may be positioned in the grooves 14 and 15 either before or after the surface 12 is tinned. The lining 13 is then molded or otherwise secured to the main body portion 11 to maintain the tubular assemblage 16 in place. Those portions of the grooves 14 which are not filled by the tubes 18 will function as additional retaining means for the lining, since the latter will fill any such portions of the grooves, as will be seen particularly in Figure 2.

Figure 4:
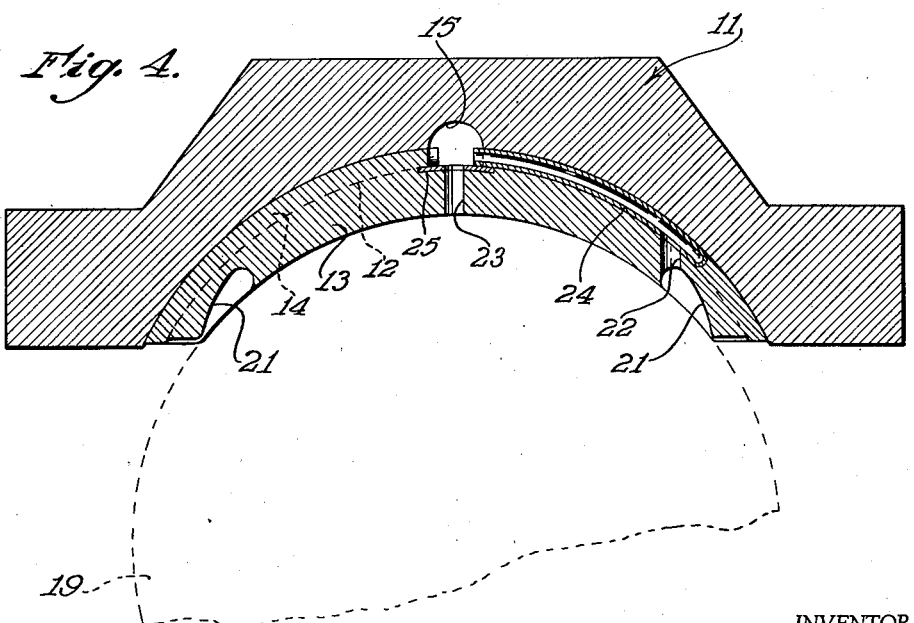
Fig. 4 is a vertical section taken substantially on the line 4—4 of Fig. 3.

The lower surface of the lining 13 is formed to substantially conform to the upper portion of the usual journal 19 (shown in broken lines in Figures 2 and 4) in a well known manner. A pair of longitudinally extending grooves or channels 21 are machined or molded in this lower surface of the lining 13, and terminate short of the ends of the lining as best seen in Figure 1, although they may be extended to either or both ends of the lining if desired. Referring to Figures 2 and 4, the channels 21 are preferably curved in cross-section to provide a fish hook shaped inner surface, the deepest portion of which is at the upper part of the channel while the lower part of the channels terminates at a point which is spaced a short distance away from the outer surface of the journal 19. The particular shape of these channels 21 and their function are more specifically described in my co-pending application above referred to. An aperture or bore 22 communicates between the upper portion of each groove or channel 21 and each of the associated tubes 18. A plurality of longitudinally spaced apertures or bores 23 are also provided which extend through the upper, central portion of the lining 13 into the tube 17. Since the tube 17 extends substantially the full length of the bearing (Fig. 1), these bores 23 need not be accurately alined with the cross tubes 18, although they may be so alined if desired. These bores 22 and 23 are preferably drilled through the lining 13 and into the conduits or tubes 18 and 17, respectively, as a final step in the manufacture of the bearing.

Figure 3:
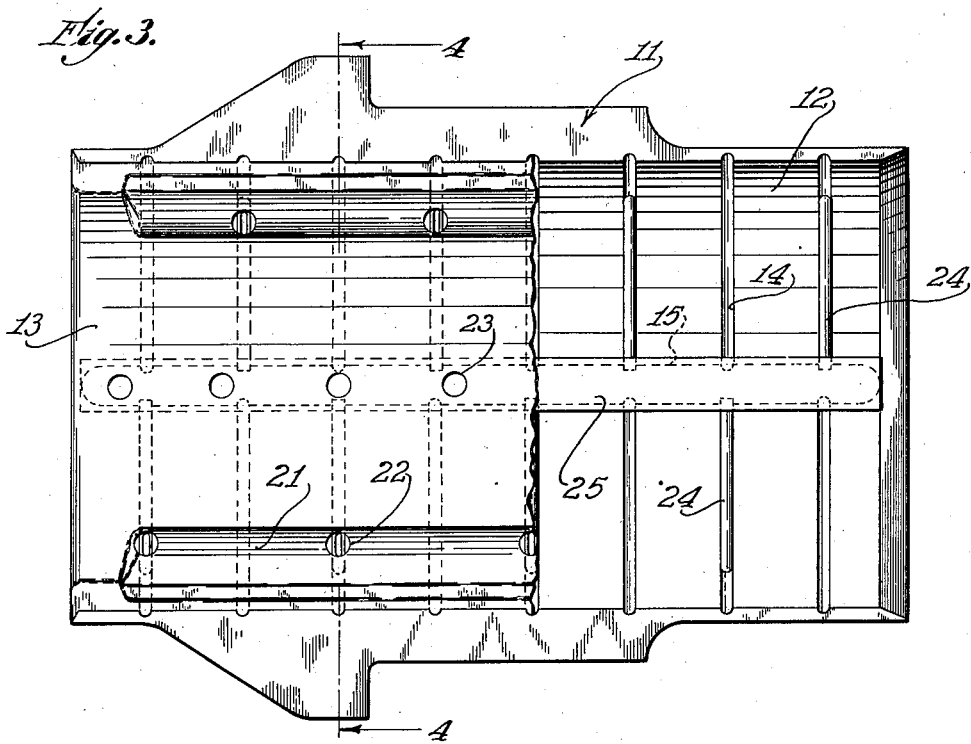
Fig. 3 is a view similar to Fig. 1 of a modified form of bearing.

The modified form of bearing shown in Figures 3 and 4 is identical to that above described, with the exception of the particular type of conduits employed. In this modification, transverse tubes 24 are used which are similar to the tubes 18. Instead of the central longitudinal tube 17, however, a longitudinally disposed plate member 25 is employed. The tubes 24 are positioned in the grooves 14 with their centrally disposed ends, which are open, terminating within the central groove 15. The plate 25 is shaped to conform to the contour of the curved surface 12 and is placed so as to completely cover the central groove 15 and the open ends of the transverse tubes or conduits 24. The tubes 24 and the plate 25 may be secured together in any suitable manner if desired to form a unitary assemblage somewhat similar to the tubular assemblage 16. However, the members 24 and 25 may be separately placed in their positions in the grooves 14 and over the groove 15, respectively. As in the case of the assemblage 16, these parts may be so positioned either before or after the surface 12 is tinned. The lining 13 is then molded or otherwise secured to the body portion 11 to maintain the members 24 and 25 in place. In this modification the bore 22 communicate with the tubes 24 in the same manner as with the tubes 18, and the bores 23 are drilled through the plate 25 instead of the tube 17, as in the modification of Figs. 1 and 2.

In this type of journal bearing, lubricating oil is supplied to the outer surface of the journal 19 in the usual manner by means of saturated waste disposed within the journal box (not shown) and contacting the lower surface of the journal, although any other means of supplying a lubricant may be employed if desired.

In the operation of the bearing, rotation of the journal 19 will carry oil into the channel 21 at the inbound side of the journal. The oil will be collected in this inbound channel and, in the operation of the instant bearing, it is thought that it will be forced through the associated apertures 22 into the tubes or conduits 18 or 23, and thence into the central longitudinal reservoir provided by the tube 17 in the one modification and the groove 15 and plate 24 in the other modification. From these central cooling reservoirs some of the oil would be deposited on the top of the journal 19 through the bores 23, and the overflow oil will flow through the opposite tubes or conduits 18 or 23 into the channel 21 at the outbound side of the journal and be carried by the latter downwardly to the waste referred to.

While it is not absolutely certain that the direction of flow of oil through the conduits 18 or 24 is as above described, it has been established that the lubricating oil does circulate through the conduits when the journal is rotated; although it may be that this circulation is through the bores or apertures 23 into the conduits, and that the oil is carried upwardly to the bores 23 by the journal.

In the instant journal bearing, since connection is provided between each of the longitudinal channels 21 in the upper oil reservoirs, rotation of the journal 19 in either direction will have the same result of automatically forcing lubricating oil into the upper reservoirs. The use of such top reservoirs has the distinct advantage of providing an oil supply at the point where it is of most importance at all times. When the journal 19 ceases to rotate, this supply is maintained, so that at the beginning of the next operation of the journal it will be immediately lubricated at its upper surface, thus eliminating the usual initial period of dry operation. The positioning of the top oil reservoirs directly adjacent the bonded surface between the main body portion 11 and the lining 13 greatly increases the cooling effect obtained by the lubricating oil over that had with the construction employed in my above mentioned co-pending application. The manufacture and relining of the bearing are also greatly facilitated, since there is no necessity for accurately alining the bores 23 with the transversely disposed tubes 18 or 24. Also, with the instant arrangement of the parts, the possibility of the lubricating oil coming in contact with the bonded surface 12 is greatly lessened.

In the relining of the bearing, the removal of the lining 13 by use of heat or the like will remove the members 16 or 24 and 25 from the main body portion 11. The addition of a new lining to the body portion will therefore be a relatively simple matter, and as is the case in the initial manufacture, the problem of keeping the lining metal from clogging the conduits will not be presented.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A journal bearing adapted to be lubricated with oil, comprising a body portion having a concave surface, a lining secured to said surface by bonding material which is subject to harm by the lubricating oil, a pair of longitudinally extending channels in the bearing surface of said lining adjacent the lower edges thereof, a longitudinally extending reservoir in said bearing adjacent said concave surface near the center thereof, separate conduits of material which is resistant to any deleterious action of the oil mounted in said bearing adjacent said concave surface interconnecting said reservoir and said channels, and apertures extending through the central portion of said lining into communication with said reservoir, whereby contact of the oil with said bonding material is substantially entirely eliminated.

2. A journal bearing adapted to be lubricated with oil, comprising a body portion having a concave surface, a lining secured to said surface by bonding material which is subject to harm by the lubricating oil, a pair of longitudinally extending channels in the bearing surface of said lining adjacent the lower edges thereof, a plurality of separate conduits of material which is resistant to any deleterious action of the oil mounted in the bearing between said body portion and said lining and each communicating with said channel, a conduit of material which is resistant to any deleterious action of the oil forming a longitudinally extending reservoir in said bearing adjacent said concave surface near the center thereof and communicating with said other conduits, and apertures extending through the center portion of said lining into communication with said reservoir, whereby contact of the oil with said bonding material is substantially entirely eliminated.

3. A journal bearing adapted to be lubricated with oil, comprising a body portion having a concave surface, a longitudinally extending groove formed in said surface, a plurality of transversely extending grooves formed in said surface and communicating with said longitudinal groove, interconnecting metal tubes which are resistant to any deleterious action of the oil disposed within each of said grooves, a metal lining secured to said surface by bonding material which is subject to harm by the lubricating oil and having a bearing surface, a pair of longitudinally extending channels in said bearing surface adjacent the edges thereof, an aperture connecting each of said transverse tubes with a said channel, and a plurality of apertures extending through said lining into communication with said longitudinally extending conduit, whereby contact of the oil with said bonding material is substantially entirely eliminated.

4. A journal bearing adapted to be lubricated with oil, comprising a body portion having a concave surface, a longitudinally extending groove formed in said surface, a plurality of transversely extending grooves formed in said surface and communicating with said longitudinal groove, a plurality of conduits of material which is resistant to any deleterious action of the oil mounted in said transverse grooves and opening into said longitudinal groove, a plate member completely covering said longitudinal groove, the open ends of said conduits being disposed below said plate member, a lining secured to said concave surface of said body portion by bonding material which is subject to harm by the lubricating oil, a plurality of apertures extending through said lining into communication with said conduits, and a plurality of apertures extending through said lining and said plate member into communication with said longitudinal groove, whereby contact of the oil with said bonding material is substantially entirely eliminated.

5. A journal bearing, comprising a body portion having a concave surface, a lining secured to said surface, a pair of longitudinally extending channels in the bearing surface of said lining adjacent the lower edges thereof, and a plurality of separate conduits mounted in the bearing between said body portion and said lining, each communicating between a said channel and an aperture in said lining adjacent the center thereof.

6. A journal bearing, comprising a body portion having a concave surface, a soft metal lining secured to said surface, a pair of longitudinally extending channels in the bearing surface of said lining adjacent the lower edges thereof, and a plurality of conduits mounted in said bearing between said body portion and said lining and interconnecting said channels, each of said conduits being tapped by a bore in said lining adjacent the center thereof.

7. A journal bearing, comprising a metallic body portion having a concave surface, a plurality of grooves extending transversely across said surface, a metal tube disposed within each of said grooves, a metal lining secured to said surface and having a bearing surface, a pair of longitudinally extending channels in said bearing surface adjacent the edges thereof, an aperture connecting each of said tubes with a said channel, and each of said tubes being tapped by a bore in said lining adjacent the center thereof, whereby a plurality of passageways are provided for the flow of a cooling medium through the bearing adjacent said concave surface.

GILBERT R. COLEMAN.